US007707151B1

(12) United States Patent
Blumenau et al.

(10) Patent No.: US 7,707,151 B1
(45) Date of Patent: Apr. 27, 2010

(54) METHOD AND APPARATUS FOR MIGRATING DATA

(75) Inventors: Steven M. Blumenau, Holliston, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/353,322

(22) Filed: Jan. 29, 2003

Related U.S. Application Data

(63) Continuation of application No. 10/211,469, filed on Aug. 2, 2002, now abandoned.

(51) Int. Cl.
  *G06F 12/02* (2006.01)
  *G06F 12/08* (2006.01)
(52) U.S. Cl. .................. 707/100; 711/165; 707/202; 707/204; 707/205; 709/232; 710/20; 710/61; 712/225; 714/5; 714/15
(58) Field of Classification Search ................. 711/165
  See application file for complete search history.

(56) References Cited

U.S. PATENT DOCUMENTS

| | | | |
|---|---|---|---|
| 5,544,347 A | | 8/1996 | Yanai et al. |
| 5,548,711 A | * | 8/1996 | Brant et al. ............. 714/5 |
| 5,680,640 A | | 10/1997 | Ofek et al. |
| 5,742,792 A | | 4/1998 | Yanai et al. |
| 5,822,531 A | | 10/1998 | Gorczyca et al. |
| 5,870,545 A | | 2/1999 | Davis et al. |
| 5,896,548 A | | 4/1999 | Ofek |
| 6,058,054 A | | 5/2000 | Islam et al. |
| 6,065,077 A | | 5/2000 | Fu |
| 6,078,990 A | | 6/2000 | Frazier |
| 6,108,748 A | * | 8/2000 | Ofek et al. .............. 711/112 |
| 6,145,066 A | | 11/2000 | Atkin |
| 6,161,218 A | | 12/2000 | Taylor |
| 6,173,377 B1 | | 1/2001 | Yanai et al. |

(Continued)

FOREIGN PATENT DOCUMENTS

WO        WO 01/98889        12/2001

(Continued)

OTHER PUBLICATIONS

The American Heritage College Dictionary, Copyright 2002, Houghton Mifflin Company, Fourth Edition, p. 1038.*

(Continued)

*Primary Examiner*—Tuan V Thai
*Assistant Examiner*—Midys Rojas
(74) *Attorney, Agent, or Firm*—Muirhead and Saturnelli, LLC

(57) ABSTRACT

One aspect is directed to a method for performing data migration from a first volume to a second volume while allowing a write operation to be performed on the first volume during the act of migrating. Another aspect is a method and apparatus that stores, in a persistent manner, state information indicating a portion of the first volume successfully copied to the second volume. Another aspect is a method and apparatus for migrating data from a first volume to a second volume, and resuming, after an interruption of the migration, copying data from the first volume to the second volume without starting from the beginning of the data. Another aspect is a method and apparatus for migrating to data from a first to a second volume, receiving an access request directed to the first volume from an application that stores data on the first volume, and redirecting the access request to the second volume without having to reconfigure the application that accesses data on the first volume.

98 Claims, 8 Drawing Sheets

U.S. PATENT DOCUMENTS

| | | | |
|---|---|---|---|
| 6,216,202 B1 | 4/2001 | D'Errico | |
| 6,233,607 B1 | 5/2001 | Taylor et al. | |
| 6,240,486 B1 | 5/2001 | Ofek et al. | |
| 6,266,784 B1 | 7/2001 | Hsiao et al. | |
| 6,269,382 B1* | 7/2001 | Cabrera et al. | 707/204 |
| 6,356,977 B2 | 3/2002 | Ofek et al. | |
| 6,367,075 B1 | 4/2002 | Kruger et al. | |
| 6,370,626 B1 | 4/2002 | Gagne et al. | |
| 6,434,637 B1 | 8/2002 | D'Errico | |
| 6,523,036 B1 | 2/2003 | Hickman et al. | |
| 6,542,909 B1 | 4/2003 | Tamer et al. | |
| 6,564,336 B1 | 5/2003 | Majkowski | |
| 6,598,134 B2 | 7/2003 | Ofek et al. | |
| 6,631,477 B1 | 10/2003 | LeCrone et al. | |
| 6,640,278 B1 | 10/2003 | Nolan et al. | |
| 6,665,812 B1 | 12/2003 | Blumenau et al. | |
| 6,691,245 B1 | 2/2004 | DeKoning | |
| 6,704,838 B2 | 3/2004 | Anderson | |
| 6,718,435 B2* | 4/2004 | Riedle | 711/114 |
| 6,760,828 B1 | 7/2004 | Black | |
| 6,832,289 B2* | 12/2004 | Johnson | 711/112 |
| 6,874,046 B1 | 3/2005 | LeCrone et al. | |
| 2002/0052941 A1 | 5/2002 | Patterson | |
| 2002/0056031 A1 | 5/2002 | Skiba et al. | |
| 2002/0133737 A1 | 9/2002 | Novick | |
| 2002/0133746 A1 | 9/2002 | Chen et al. | |
| 2003/0009707 A1 | 1/2003 | Pedone et al. | |
| 2003/0014523 A1 | 1/2003 | Teloh et al. | |
| 2003/0115434 A1* | 6/2003 | Mahalingam et al. | 711/112 |
| 2003/0188218 A1 | 10/2003 | Lubbers et al. | |
| 2003/0217119 A1 | 11/2003 | Raman et al. | |
| 2003/0229764 A1 | 12/2003 | Ohno et al. | |
| 2004/0024975 A1 | 2/2004 | Morishita et al. | |
| 2004/0034628 A1 | 2/2004 | Numao et al. | |
| 2004/0139237 A1 | 7/2004 | Rangan et al. | |
| 2004/0215845 A1 | 10/2004 | Davani et al. | |
| 2005/0188166 A1* | 8/2005 | Fujibayashi et al. | 711/162 |

FOREIGN PATENT DOCUMENTS

| | | |
|---|---|---|
| WO | WO 02/03203 | 1/2002 |

OTHER PUBLICATIONS

Blunden M., et al., Storage Networking Virtualization What's it all about, Dec. 2000 IBM Redbooks.

Khattar R., "Introduction to Storage Area Network, SAN", Aug. 1999, IBM.

Pabst, Thomas, "Fast and inexpensive—Promise's FastTrak66 IDE RAID-Controller." Mar. 29, 2000. Tom's Hardware http://.tomshardware.com/storage/20000329/fastrak66-02.html>.

Patterson, David A. et al. "A Case for Redundant Arrays of Inexpensive Disks (RAID)", ACM 0-89791-268-3/88/0006/0109, 1998, pp. 109-116.

"Promise Milestone." 2005 http://www.promise.com/company/about/prms_milestone_eng.asp.

"Redundant array of independent disks." Wikipedia: The Free Encyclopedia. Nov. 10, 2005 <http://en.wikipedia.org/wiki/Redundant_array_of_inexpensive_disks>.

The American College Dictionary, Copyright 2002, Houghton Mifflin Company Fourth Edition, p. 1038.

* cited by examiner

| State No. | State of Write on Interruption | Comments |
|---|---|---|
| 1 | Write is not performed on either $V_1$ or $V_2$ | OK |
| 2 | Write is performed on $V_1$, but not $V_2$ | Undesirable State |
| 3 | Write is performed on $V_2$, but not $V_1$ | Undesirable State |
| 4 | Write is performed on both $V_1$ and $V_2$ | OK |

Table 500

Figure 5

METHOD AND APPARATUS FOR MIGRATING DATA

CROSS REFERENCE TO RELATED APPLICATIONS

This application is a continuation of application Ser. No. 10/211,469, entitled METHOD AND APPARATUS FOR MIGRATING DATA, filed Aug. 2, 2002, now abandoned.

FIELD OF THE INVENTION

The invention relates generally to transferring data, and more particularly to migrating data from one storage location to another.

BACKGROUND OF THE INVENTION

With the growth of networked computer systems, shared data storage systems have become commonplace. In a networked computer system, multiple hosts are generally coupled by a network to a shared data storage system for the purpose of storing applications and their data. Fibre channel is an example of a network that can be used to form such a configuration. Fibre channel is a network standard that allows multiple initiators to communicate with multiple targets over the network, where the initiator and target may be any device coupled to the network.

Storage systems generally have a finite amount of storage capacity (used to store applications, application data, user data (e.g., databases) and the like) and finite performance bandwidth. Server applications, users, and their data have different growth rates, so it often is difficult to predict and design a storage configuration that is suitable for a long period of time. When capacity of a resource or its performance is at or approaching its limit, the storage configuration typically is adjusted to reallocate resources.

Because storage capacity and performance of the storage server is finite due to performance limitations of devices, processors, memory, etc., there is occasionally a need to migrate (or move) data to another location in the networked computer system. With this migration of data comes an associated migration or reallocation of storage and performance load. Data migration, or movement of data from one location to another, is generally a complicated and time consuming task, requiring many hours of planning and testing.

For example, in the case where the performance of the storage system is approaching its capacity, data may be migrated to another storage system having available capacity.

A conventional way in which people migrate data is to stop execution of the application that access the data, move the application and its data to a new storage location, reconfigure the application to point to the new location, and restart the application. It is a drawback of current migration techniques to require data movement to occur only after the data and their associated applications are offline. Depending on the size of the data, a migration process may take a long time (e.g., days), and the data being to migrated is unavailable for the period of time during the migration. Further, if at any point during the migration there is a failure of one or more elements involved in the migration, the user may have to restart the migration from the beginning. For large migrations, there is much lost time, effort, and money associated with restarting the migration process.

SUMMARY OF THE INVENTION

One illustrative embodiment of the invention is directed to a method for performing data migration in a computer system including at least one host and at least one storage system that stores data written by the host, the at least one storage system providing a plurality of storage volumes to the host to store data written by the host, the plurality of storage volumes including at least one first storage volume and at least one second storage volume. The method comprises acts of migrating data from the at least one first storage volume to the at least one second storage volume, the at least one first storage volume being allocated to at least one application program in the computer system to store data, and maintaining the at least one first storage volume available to the at least one application program so that write operations from the at least one application program can be performed to the at least one first storage volume during the act of migrating.

Another illustrative embodiment is directed to a method for performing data migration in a computer system including at least one host and at least one storage system that stores data written by the host, the at least one storage system providing a plurality of storage volumes to the host to store data written by the host, the plurality of storage volumes including at least one first storage volume and at least one second storage volume. The method comprises acts of migrating a data set from the at least one first storage volume to the at least one second storage volume, the at least one first storage volume being allocated to at least one application program in the computer system to store data wherein the act of migrating starts at a beginning of the data set and progresses to an end of the data set, and resuming, after an interruption, the migrating act without restarting from the beginning of the data set.

A further illustrative embodiment is directed to a computer-readable medium encoded with instructions for execution on a computer system, the instructions when executed, perform a method comprising acts of migrating data from at least one first storage volume to at least one second storage volume, the at least one first storage volume being allocated to at least one application program in the computer system to store data, and maintaining the at least one first storage volume available to the at least one application program so that write operations from the at least one application program can be performed to the at least one first storage volume during the act of migrating.

Another illustrative embodiment is directed to a computer-readable medium encoded with instructions for execution on a computer system, the instructions when executed, perform a method comprising acts of migrating a data set from at least one first storage volume to at least one second storage volume, the at least one first storage volume being allocated to at least one application program in the computer system to store data wherein the act of migrating starts at a beginning of the data set and progresses to an end of the data set, and resuming, after an interruption, the migrating act without restarting from the beginning of the data set.

Another illustrative embodiment is directed to a host computer for migrating data in a computer system including the host computer and at least one storage system that stores data written by the host computer, the at least one storage system providing a plurality of storage volumes to the host computer to store data written by the host computer, the plurality of storage volumes including at least one first storage volume and at least one second storage volume. The host computer comprises a processor to execute at least one application program, and a controller adapted to migrate data from the at least one first storage volume to the at least one second storage volume, the at least one storage volume being allocated to at least one application program to store data, the controller being further adapted to maintain the at least one first storage volume available to the at least one application program so that write operations from the at least one application program can be performed to the at least one first storage volume during the act of migrating.

Another illustrative embodiment is directed to a host computer for migrating data in a computer system including the host computer and at least one storage system that stores data written by the host computer, the at least one storage system providing storage volumes to the host to store data written by the host computer, the plurality of storage volumes including at least one storage volume and at least one second storage volume. The host computer comprises a processor to execute at least one application program, and a controller adapted to migrate a data set from at least one first storage volume to at least to one second storage volume, the at least one storage volume being allocated to at least one application program in the computer system to store data wherein the controller begins migrating data from a beginning of the data set and progresses to an end of the data set, the controller being further adapted to resume, after an interruption, migrating the data set without starting from the beginning of the data set.

A further illustrative embodiment of the invention is directed to a method for migrating data in a computer system including at least one host and at least one storage system that stores data written by the host, the at least one storage system providing a plurality of storage volumes to the host to store data written by the host, the plurality of storage volumes including at least one first storage volume and at least one second storage volume. The method comprises acts of (A) migrating data from the at least one first storage volume to at least one second storage volume, the at least one first storage being allocated to at least one application program in the computer system to store data, the at least one second storage volume not being allocated to the application, and (B) after the act (A) is complete, receiving an access request from the at least one application program directed to the at least one first storage volume and redirecting the access request to the at least one second storage volume without reconfiguring the at least one application program.

Another illustrative embodiment of the invention is directed to a computer-readable medium encoded with instructions for execution on a computer system, the instructions when executed, perform a method for migrating data in a computer system including at least one host and at least one storage system that stores data written by the host, the at least one storage system providing a plurality of storage volumes to the host to store data written by the host, the plurality of storage volumes including at least one first storage volume and at least one second storage volume. The method comprises acts of (A) migrating data from the at least one first storage volume to the at least one second storage volume, the at least one first storage being allocated to at least one application program in the computer system to store data, the at least one second storage volume not being allocated to the at least one application program, and after the act (A) is complete, receiving an access request from the at least one application program directed to the at least one first storage volume and redirecting the access request to the at least one second storage volume without reconfiguring the at least one application program.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

In the drawings:

FIG. 5 is a table showing possible write states as a result of an interruption of migration;

DETAILED DESCRIPTION

One embodiment of the invention is directed to a method for migrating data from one storage location to another which avoids having to restart the migration over from the beginning if the migration is interrupted. When an interruption is experienced using conventional migration techniques, a current state of the migration process is lost. Therefore, the migration process must be restarted from the beginning, as there is no to ability to recover state. An interruption may be, for example, a loss of power of the server system performing the migration, crash of one or more entities involved in the migration process, loss of network communication, or other failure that causes a loss of state information or otherwise prohibits migration to continue. Because the migration process is restarted from the beginning of the data set being migrated, much time and effort is wasted, which can be particularly troubling when the migration process requires the unavailability of data to the applications that access it.

According to one aspect of the invention, a method is provided for restarting migration without having to start over, thereby reducing the time of data unavailability and reducing resources needed to re-transfer previously-transferred data. For example, one or more systems involved in the migration may store, in a persistent manner, state information indicating portions of the data set successfully copied. Because state is stored persistently, a migration process may return to that known state and continue the migration process following an interruption.

According to another aspect of the invention, the data set is made available for reads and writes during the period that the data set is being migrated to further increase data availability. Because both reads and writes can be performed in real time on the data being migrated, costs associated with migration are reduced as there is no unavailability period of the data.

Figure 1:
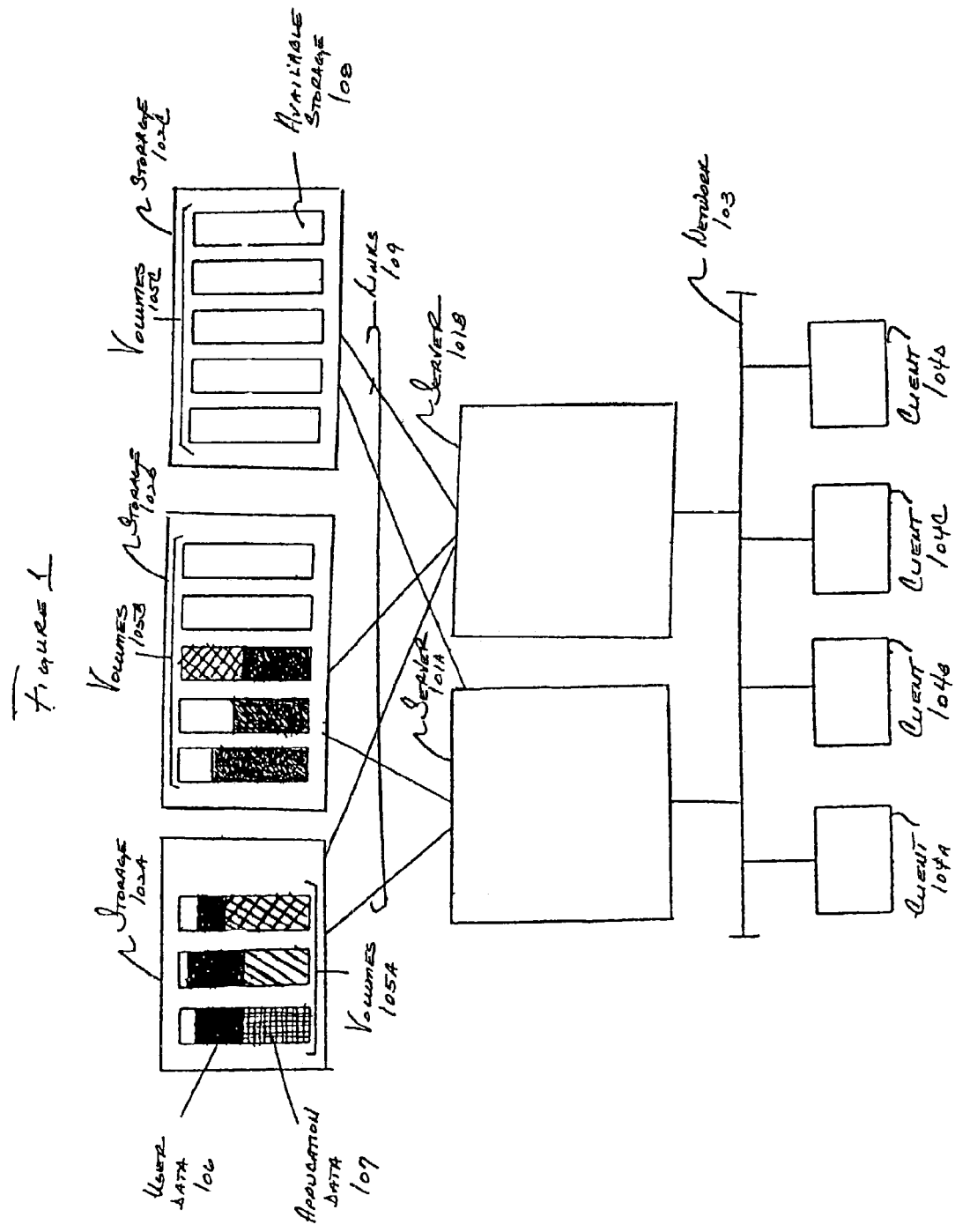
FIG. 1 shows a block diagram of a system suitable for incorporation of various aspects of the invention.

Such migrations may be performed by any number and type of processor, as the present invention is not limited in this respect. For example, one or more general-purpose computer systems such as a servers 101A, 101B may be employed as shown in FIG. 1. Servers 101A-101B are systems that provide storage services (from storage systems 102A-102C) to one or more clients 104A-104D that are generally coupled to servers 101A-101B through a communication network 103. Network 103 may be, for example, Fast Ethernet, Gigabit Ethernet, Fibre Channel, or any other communication medium for communicating information.

It should be appreciated that the storage configuration shown in FIG. 1 is only an example, as the invention is not limited to use with any particular type of system configuration. For example, the servers need not be connected to the clients over a network; the servers may be directly connected to one or more clients. Also, the servers 101A-101B need not be employed at all, as the clients can be attached (over a network or a direct connection) directly to the storage systems 102A-102C. In such a configuration, the clients may be computer systems (e.g., general-purpose computer systems) that can be adapted to perform migration of data according to various embodiments of the invention as discussed below.

In the configuration of FIG. 1, servers 101A-101B are coupled to one or more storage systems 102A-102C, each of which may include one or more volumes 105A-105C for storing information. A volume is a storage resource into which a file system, database management system (DBMS) or other application can store data. A volume can correspond to a physical storage device (e.g., a disk drive) within the storage system, or may correspond to a virtual storage location (e.g., in the case where the storage system is an intelligent storage system that performs a mapping between virtual storage locations and physical storage locations located on one or more media).

Information stored in the volumes may be any information (data, voice information, etc.) capable of being stored on a data storage device. For example, volume 105A may be configured to store user data 106 and application data 107. Servers 101A-101B are coupled to storage systems 102A-102C by one or more communication links 109, which may be, for example, Fibre Channel, Fast Ethernet, Gigabit Ethernet, or any other type of communication link, network, or group of networks.

Storage systems 102A-102C may be any type of storage system. For example, Symmetrix storage systems available from the EMC Corporation of Hopkinton, Mass. may be employed. Servers 101A-101B and/or clients 104A-104D may be, for example, general-purpose (or special-purpose) computer systems configured to provide shared storage resources to one or more clients 104A-104D. Servers 101A-101B may be computer systems having one or more processors (e.g., Pentium processor (available from the Intel Corporation of Santa Clara, Calif.), Althon processor (available from AMD of Sunnyvale, Calif.), UltraSPARC II and III processors (available from Sun Microsystems of Santa Clara, Calif.), PA-RISC, Xeon processors (available from Hewlett-Packard Corporation of Palo Alto, Calif.) or other processor type) that execute an operating system (e.g., Windows XP, Solaris, Unix, or other type of operating system). Any processor type of processor and operating system may be used, and the invention is not limited to any particular implementation.

Servers 101A-101B and/or clients 104A-104D may also include memory for storing and executing programs, one or more storage devices (e.g., hard disks) for storing operating system, application and user data, and one or more I/O devices (e.g., keyboard, display, mouse, etc.). Servers 101A-101B and/or clients 104A-104D may also include one or more communication interfaces that allow servers 101A-101B to communicate with storage systems 102A-102C. These interfaces may be, for example, Host Bus Adapters (HBAs) that communicate with storage systems 102A-102C using a communication protocol (e.g., Small Computer Systems Interface (SCSI) protocol, Fibre Channel protocol, or other protocol type).

As discussed above, there may be a need to migrate data from one location to another. For example, there may be a need to migrate data from storage system 102A to another storage system because of performance reasons (e.g., storage system 102A is processor bound or approaching its performance limit). There may also be a need to migrate data from storage system 102A for storage capacity reasons. For example, storage system 102A may have one or more storage volumes that are full or approaching their capacity. Therefore, one or more of servers 101A-101B and/or clients 104A-104D may be configured to transfer data (e.g., application data 107, user data 106) to an available storage location, such as available storage location 108 in storage system 102C.

According to one embodiment of the invention, one of the servers 101A-101B and/or clients 104A-104D may execute a program that allows it to migrate data. This can be performed in numerous ways. According to one embodiment of the invention, the program is executed by, and operates in, an I/O (input/output) stack of the computer (e.g., servers 101A-101B or clients 104A-104D) on which it executes.

Although it is shown by way of example that various aspects of the invention may be performed by a server (e.g., server 101A), it should be appreciated that the invention is not limited to this particular implementation. For example, various aspects of the invention may be performed by one or more hosts (e.g., a client as shown in FIG. 1), for example in a system having the configuration of FIG. 1, or in any other storage configuration (e.g., a configuration having no servers and having storage systems directly connected to clients).

Figure 2:
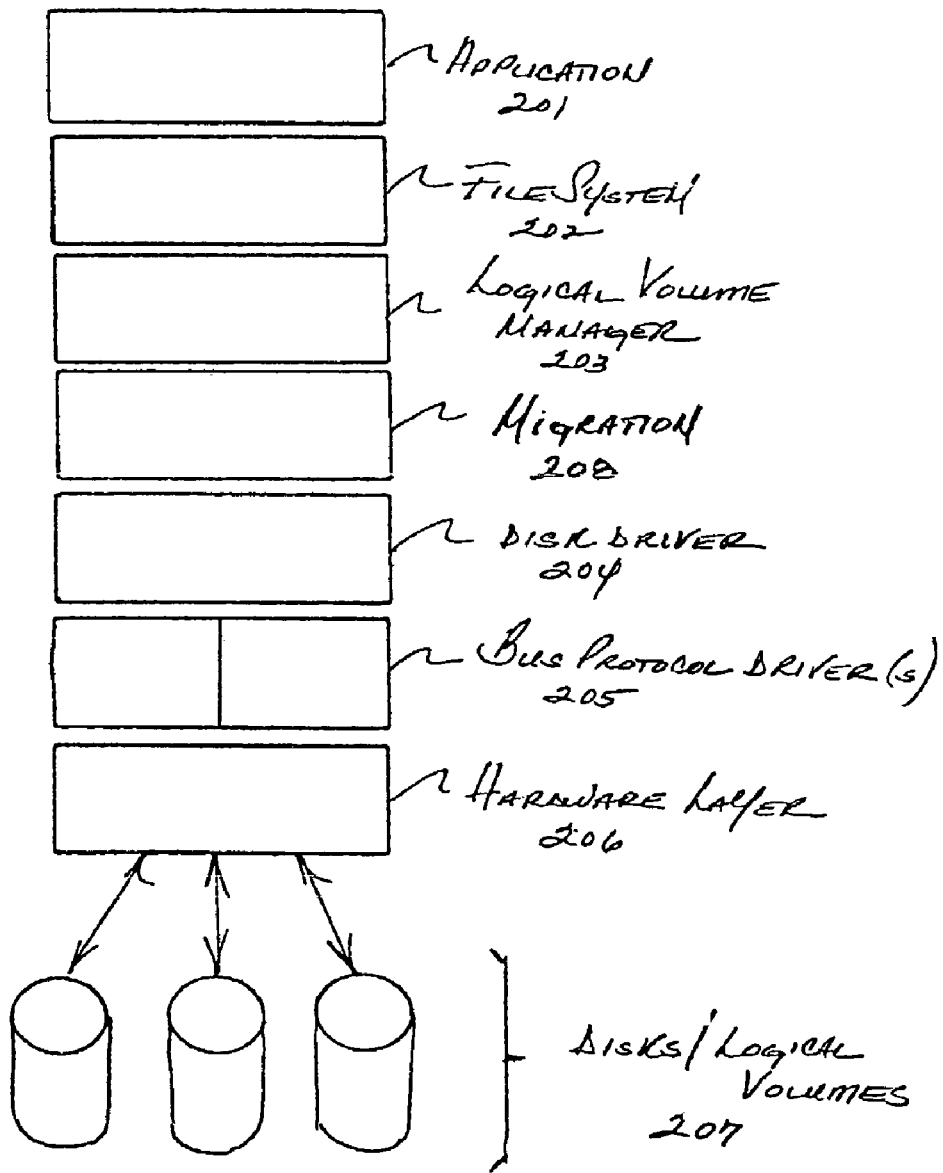
FIG. 2 shows a logical arrangement of an I/O path in a system suitable for incorporation of various embodiments of the invention.

FIG. 2 shows a logical arrangement of an I/O stack of a host (e.g., server 101A) in which one embodiment of the invention may be implemented. The I/O stack begins with an application layer 201. Applications executing in layer 201 may generate data to ultimately be stored on one or more logical volumes of storage, but those volumes of storage are transparent to the application layer. The application layer stores data in files, database records or other logical units of storage that are then mapped, via a file system 202, Logical Volume Manage (LVM) 203, or other type of mapping layer (e.g., DBMS layer) onto volumes of storage. The volumes of storage can be logical volumes (as referred to herein as disks) 207 provided from the storage systems, or may be volumes of storage provided by the LVM 203.

LVM 203 provides volume mapping services to file system layer 202 or other higher-level layers (e.g., application layer 201 or a DBMS layer). More particularly, LVM 203 provides a mapping of the logical volumes 207 of storage provided by the storage system to create higher level volumes of storage. LVM 203 and/or the file system layer 202 translate logical I/O requests from application layer 201 into "physical" addresses and send I/O to specific device drivers operating in layer 204.

Disk driver layer 204 forms read and write commands to individual logical volumes or disk devices 207. The I/O stack may also include one or more bus protocol driver layers (205) such that the server 101A and storage systems on which disks 207 are stored may communicate using one or more protocols. IDE and SCSI are common bus protocols that may be used, but the present invention is not limited in this respect.

I/O is then passed to hardware layer 206, which serves as an interface to storage systems on which disks 207 are stored. Data retrieved from disks 207 is passed up the I/O stack in a reverse manner.

According to one embodiment of the invention, a migration layer 208 is provided in the I/O stack to perform data migration functions. More particularly, migration layer 208 is configured to move data between logical volumes 207 for the purpose of migrating data from one logical volume 207 to another. As discussed below, the logical volumes may be located on a same storage system or different storage systems.

As mentioned above, in one embodiment of the invention, a capability is provided to keep on-line the data set being migrated. This can be done in any of numerous ways, and this aspect of the present invention is not limited to any particular implementation technique. During the migration, there will be two (at least partial) copies of the data set. To assist in maintaining coherency between them, in one exemplary implementation, layer 208 is configured to accept and process write requests directed to the logical volume(s) being migrated. These requests can be originated by the server 101A, or may be received from one or more clients 104A-104D. In particular, in one embodiment of the invention, the logical volume(s) being migrated are kept on-line so that write operations may be applied to the logical volumes during the migration. In one embodiment of the invention, when a write request to a logical volume being migrated is received, it is applied to both the source and destination locations (e.g., source and destination volumes) involved in the migration for reasons discussed below.

As mentioned above, in another embodiment of the invention, a technique is provided to enable an interrupted migration to be resumed without going back to the beginning. This can be done in any of numerous ways, as this aspect of the invention is not limited to any particular implementation technique. In one exemplary implementation, layer 208 is configured to store state information indicating portions of the data set being migrated for which a successful copy has been achieved. More particularly, layer 208 may, during the migration process, store state information in a persistent manner that allows server 101A to continue the migration after an interruption, in a manner discussed in more detail below. Because server 101A can restore the state of the migration, the server 101A can avoid restarting the migration from the beginning if it is interrupted. State information may be stored, for example, in a source or destination volume, or in any other persistent location (e.g., on a local disk of server 101A), as the invention is not limited to any particular implementation.

In one embodiment of the invention, layer 208 is implemented in a filter driver adapted to perform data migration functions. However, it should be appreciated that the invention is not limited to this particular implementation, as the functions performed by the layer 208 can be implemented on other ways. A filter driver is commonly inserted into the I/O stack to perform a particular service or function. One example of a filter driver is the PowerPath driver available from the EMC Corporation, which has numerous capabilities, including the ability to perform path selection in a multi-path system wherein multiple paths extending between the host and the storage system can be used to access one or more logical volumes. In particular, the PowerPath filter driver resides in the I/O stack and receives all I/O requests to storage from LVM layer 203, file system layer 202, or application layer 201, and selects one of the multiple communication paths to storage to process the I/O request.

According to one embodiment of the invention, a filter device, of which the PowerPath filter driver is only one example, may be employed to implement the migration layer 208 to perform reads and writes from/to source and target logical volumes to support data migration.

As discussed above, the present invention is not limited to implementation in a filter device, as numerous other implementations are possible. For example, the functions described herein as being performed by migration layer 208 may be incorporated in LVM 203, file system layer 202, or any other layers of the I/O stack. The embodiments of the invention described herein may also be implemented in hosts that have different abstraction layers than those shown in FIG. 2. For example, various aspects of the invention may be incorporated in an application layer that communicates directly to LVM layer 203, or lower layers of the I/O stack. For example, an application may communicate directly to LVM layer 203 by calling an application program interface (API) function provided as part of LVM 203 to access one or more logical volumes.

Figure 3:
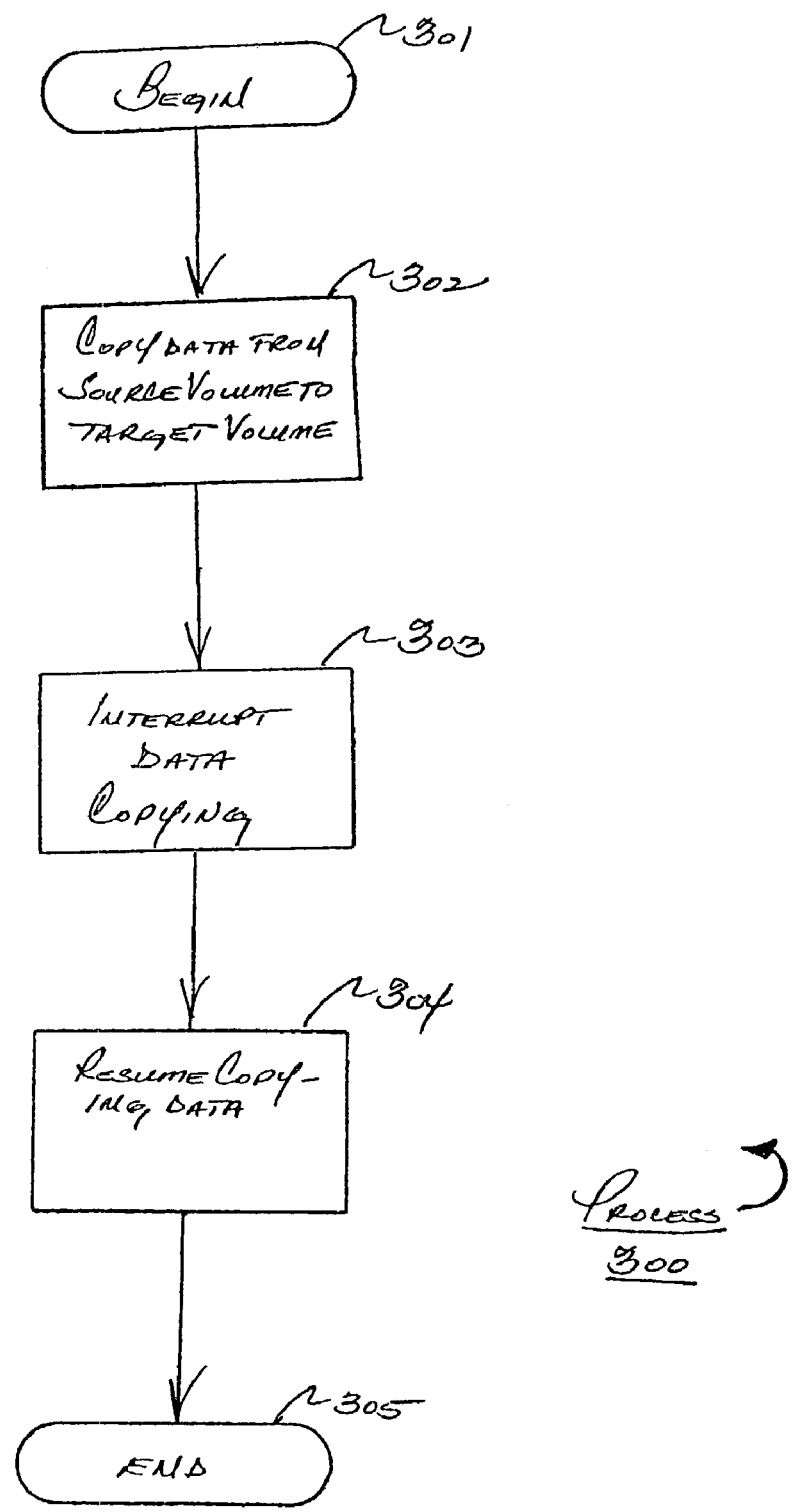
FIG. 3 shows a process for migrating data according to one embodiment of the invention.

FIG. 3 shows a process 300 for migrating data according to one embodiment of the invention. At block 301, process 300 begins. At block 302, migration layer 208 begins copying data from at least one source volume to at least one target volume. While the source volume is still active and on line (i.e., readable and writeable by application programs), migration layer 208 issues read requests from the source volume and write requests to the target volume to perform the copy. As discussed above, these volumes may be located on the same or different storage systems. This copy process may be a primary process executing in the host performing the migration (e.g., server 101A), or may be configured as a background process executing in the host.

As discussed in more detail below, in one embodiment of this copy process, migration layer 208 stores a state of the copy process in a persistent data location. This location may be, for example, located on the source or target volume of the migration, in non-volatile memory on the host, or elsewhere in the computer system. For example, state information may be stored periodically after, for example, a specified number of blocks have been transferred, a certain amount of time has elapsed, or other occurrence.

At block 303, the copying process is interrupted such as, for example, by a server crash or other situation that causes loss of volatile state data.

Because state information is stored in a persistent data location, migration layer 208 is able to resume copying data at block 304 based upon a saved state of the copy process. Thus, the data already copied need not be re-copied, which can enable the copy process to be completed more quickly.

At block 305, process 300 ends.

As mentioned above, according to one embodiment of the invention, the source volume(s) being migrated are maintained online, so that writes may occur to the source volume(s) during the migration. To support that embodiment, the migration layer 208 may be configured to apply write operations directed to the source volume(s) to both the source and target volume(s) during the migration process. In this manner, updates of data already migrated are performed to the target volume(s) to ensure that when the migration is complete, the target volume(s) are up-to-date with the source volume(s).

Figure 4:
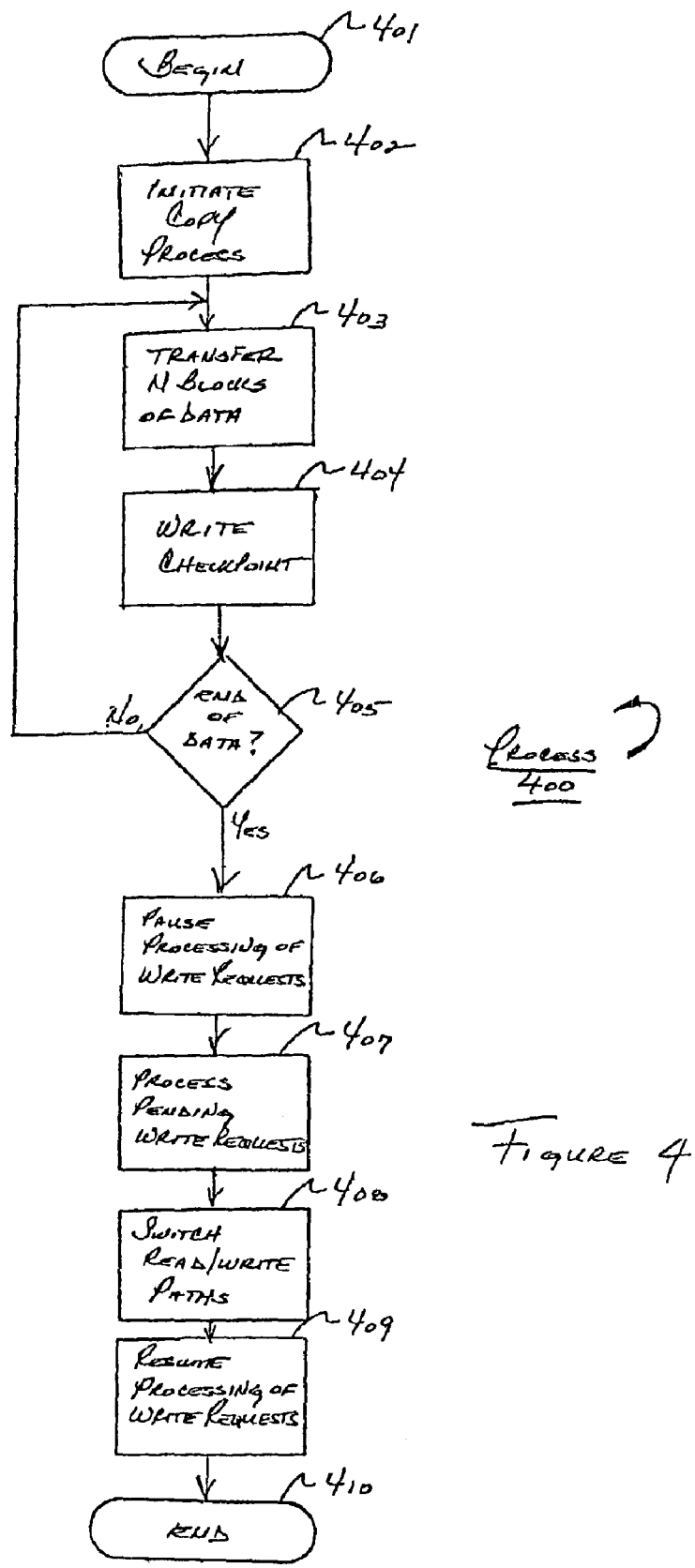
FIG. 4 shows a process for migrating data according to an alternative embodiment of the invention.

The process of FIG. 3 can be implemented in any of numerous ways, as the present invention is not limited to any particular implementation. One illustrative implementation of the copy process performed at block 302 (FIG. 3) is shown in FIG. 4, which shows an illustrative process for migrating data according to one embodiment of the invention. Process 400 is one embodiment of a migration process that can tolerate an interruption, and then resume the migration without restarting at the beginning. Process 400 can also be used to resume the migration (block 304), so long as prior to resuming the copy process at block 402, the previously-saved state (e.g., indicated by a checkpoint as discussed below) is retrieved to determine the point at which the migration process should resume.

At block 401, process 400 begins. At block 402, the copy process is initiated to copy the data set from the source volume(s) to the target volume(s). In the embodiment shown, process 400 writes a checkpoint after every N blocks have been successfully copied to the target volume(s). This checkpoint indicates a known good copy operation between the source and target volumes. For example, at block 403, the process transfers N blocks of data from the source volume(s) to the target volume(s), and at block 404, the process writes a checkpoint after the transfer of the N blocks is completed.

The number of blocks N after which a checkpoint is written may be any value. For example, the value of N may be chosen to allow for a reasonable time to recopy some data if the migration is resumed after interruption. For instance, for a particular value of N, it may take fifteen minutes to redo a copy of N blocks from the first volume to the second volume. Thus, if there is an interruption of the migration, there will be no more than fifteen minutes involved in re-copying data, as there is a maximum of N blocks that will need to be recopied. The invention is not limited to any particular value of N, and it should be appreciated that N can be a fixed or variable value.

It should be appreciated that the invention is not limited to storing state information based on a number of blocks transferred, as numerous other techniques are possible (e.g., set a checkpoint after a specified amount of time has expired). Any information that identifies the state of the migration and allows the migration operation to be resumed may be stored as the checkpoint.

At block 405, a determination is made as to whether the end of the data set being migrated is reached. If not, the process returns to block 404 to continue the data transfer. When it is determined at block 405 that the end of the data being migrated is reached, the process(s) pauses processing of any new write requests at block 406 by making the volume temporarily unavailable to applications, hosts, or clients. The process then flushes the I/O queue by processing any pending write requests at block 407.

At block 408, the process switches read/write paths to direct new read and write requests to the new location of the data (e.g., the target volume(s)). This can be performed in any of numerous ways, as the present invention is not limited to any particular switching technique. For example, the appropriate entities on the host (e.g., file system layer 202 and LVM 203) can be reconfigured to access the new target volume(s). Alternatively, in accordance with one embodiment of the invention, the switch can be performed without requiring reconfiguration of the host. A technique for performing such a switch is described in commonly assigned co-pending U.S. application Ser. No. 10/122,566, entitled METHOD AND APPARATUS FOR MANAGING ACCESS TO VOLUMES OF STORAGE, which is incorporated herein by reference. As described therein, a switch to a target volume can be performed by a filter driver (e.g., migration layer 208 in FIG. 2) that can intercept I/O requests directed to a source volume and redirect them to a target volume in a manner that is transparent to higher level layers in the to host (e.g., the applications 201, file system layer 202 and LVM 203).

After the read/write paths are switched, the processor resumes processing of write requests (redirected to the target volume(s)) at block 409. At block 410, process 400 ends.

In view of the fact that the source volume(s) are maintained online during the migration, it should be appreciated that there is a risk that the system might crash while one or more write I/O operations were pending. In one embodiment of the invention, a technique is employed to handle a crash that occurs while performing a migration and while an I/O write operation is pending. As shown in table 500 of FIG. 5, there are four possible states in which a write operation could possibly be when the system crashed.

In a first state (state 1), the write operation has not been performed successfully on either the source volume (V1) or the target volume (V2). This state is not problematic, as the source (V1) and target (V2) volumes are consistent, such that the migration is not at risk of being performed inaccurately. It is entirely within the control of the application program that issued the outstanding write requests to recover from the crash. The application will not have received an acknowledgment that the write completed, and most applications will reissue the write request after recovery from the crash. For example, in the case of a DBMS (e.g., Oracle), the DBMS will keep a queue of I/O operations and their status (e.g., pending, completed). If an operation is not completed within a certain amount of time, the DBMS will reissue the request.

In a second state (state 2), the write is completed to the source volume, but not to the target volume. This state is potentially problematic, as the source and target volumes are inconsistent. In particular, if the write is acknowledged to the application as completed, the application will not reissue the write request. If the write was directed to a point before the last checkpoint (e.g., a write operation is performed on data already copied to the second volume), the newly written data would be "lost" as the data would never be updated to the target volume. This could cause serious problems when the migration was completed and a switch was made to the target data set.

In a third state (state 3), the write is completed to the target volume, but not to the source volume. This state is undesirable also, because it results in the target volume not being an accurate copy of the source.

In a fourth state (state 4), the write operation is performed on both the source and target volumes. This state is not problematic because the volumes are consistent. If the write operation was acknowledged to the application, the application would likely not reissue it. If the crash occurred before write operation was acknowledged, the write operation may be reissued by the application.

One embodiment of the invention is directed to a migration operation that avoids or resolves undesirable states 2 and 3 discussed above to ensure recovery under all conditions when migration is interrupted, by taking two actions. First, when a write request is issued to the source volume(s), it is not acknowledged to the application as completed unless and until the data has been successfully written to both the source and target volumes. Thus, from the perspective of the application, the write request will either have completed or not. If the write is acknowledged, then state 4 (FIG. 5) is achieved which is not problematic as discussed above. If the write is not acknowledged, then any of states 1-3 may have been achieved, and it is expected that the application that issued the write request will seek to recover.

Figure 6:
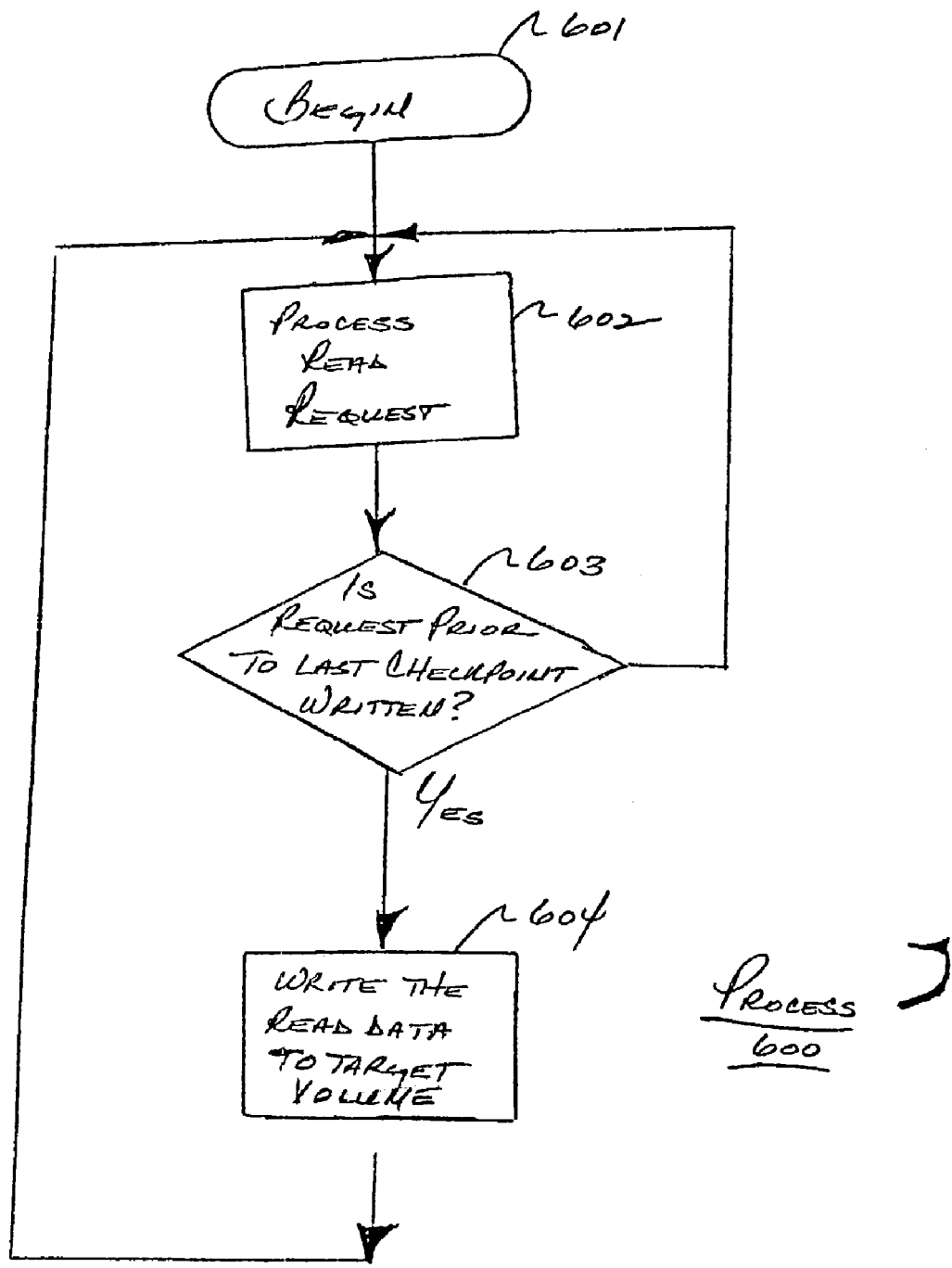
FIG. 6 shows a process for reading data during a migration according to one embodiment of the invention.

An application seeking to recover from a failed write request may perform a read operation to see if the write data made it to its destination. If the system was in state 2 (FIG. 5) with good data located on the source but not the target, the application might not reissue the write, as it would perceive it as unnecessary. Because the migration is transparent to the application and it will not check the target volume to avoid inconsistency, the second action performed in accordance with one embodiment of the invention (an illustrative implementation is shown in FIG. 6) is to respond to read requests to the source by writing the read data to the target volume. Thus, the recovery actions by the application will result in the source and target volumes storing consistent data.

FIG. 6 shows one process 600 used to respond to read requests during a migration. At block 601, process 600 begins. At block 602, process 600 processes a read request (from the application layer) of the data being migrated. If, at block 603, it is determined that the request is for a data location located prior to the last checkpoint written, the process reads the data from the source volume to fulfill the request, and writes the read data to the target volume at block 604. In this manner, any update to the source volume that was not performed to the target volume prior to a crash is updated when read from the source volume.

In the embodiment of FIG. 6, the data read during a read request is only written to the target volume if the read is to a location prior to the last checkpoint. This is sufficient because any inconsistency between the source and target volumes at locations after the checkpoint will be resolved as the migration progresses and reaches that point to update the target from the source. By not performing the writes for reads before the last checkpoint, unnecessary performance degradation for the application is avoided. However, it should be appreciated that the present invention is not limited in this respect, as the data read from locations after the last checkpoint could also be written to the target volume.

Figure 7:
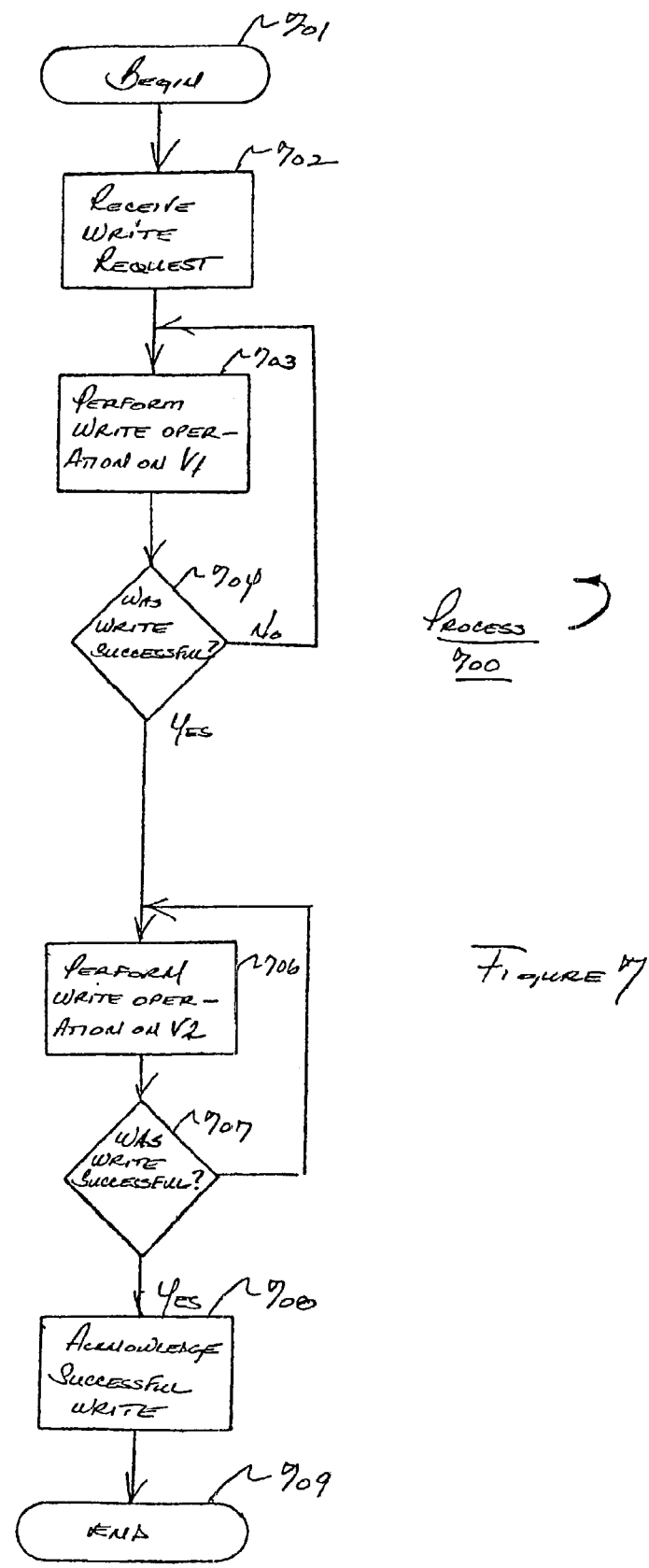
FIG. 7 shows a process for performing a write to two volumes according to one embodiment of the invention.

According to another aspect of the invention, writes are performed first to the source volume and then to the target volume. This process avoids the third state (state 3) shown in FIG. 5, i.e., the state of writing to the target volume and then experiencing an interruption prior to writing to the source volume. FIG. 7 shows a process 700 for performing a synchronous-based write operation according to this embodiment of the invention. It is termed a "synchronous" write as the writes to the source and target volumes occur in a predefined order.

At block 701, process 700 begins. At block 702, the process receives a write request to data in the process of being migrated. At block 703, the process performs a write operation on the source volume. If, at block 704 the write operation was successful, then the process performs the write operation on the target volume. If, at block 707, the write was successful, the process acknowledges the successful write to the application. At block 709, process 700 ends.

Figure 8:
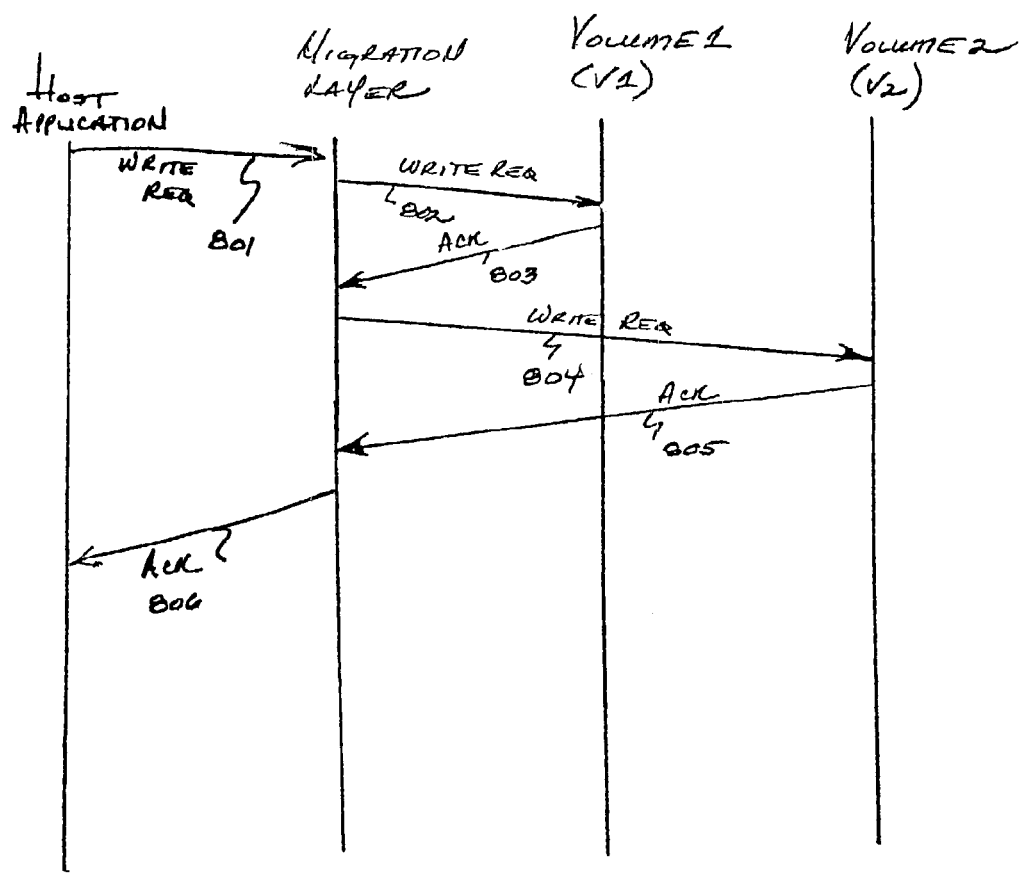
FIG. 8 shows an event diagram of a host-based system used to perform a synchronous write operation according to one embodiment of the invention.

FIG. 8 shows an event diagram illustrating the synchronous host-based write operation according to the embodiment of the invention discussed above with respect to FIG. 7. As shown, a host (e.g., an application executing on server 101A in the examples discussed above) issues a write request 801 to the source volume (volume 1). This write operation may be received and processed by an entity (e.g., by migration layer 208) that performs writes to both source and target volumes. In this synchronous write operation, the source volume (V1) is chosen as the master, and the target volume (V2) is chosen as the slave. Write operations are performed and acknowledged on the master prior to issuing a write to the slave.

The migration layer 208 issues the request 801 to the source volume as request 802.1f the write request 802 issued to the source volume was successful, an to acknowledgement 803 is sent to the migration layer 208 indicating that the write was successfully performed to the source volume. The migration layer then issues a write request 804 to the target volume requesting that the write previously executed on the source volume should be executed on the target volume. If the write operation to the target volume was successful, an acknowledgement 805 is sent to the migration layer. An acknowledgement 806 may be then sent to the host application indicating that the write operation was successful (and therefore the write has been applied to both volumes). In this manner, the order by which write operations are performed is determined a priori.

The above-described embodiments of the present invention can be implemented in any of numerous ways. For example, the above-discussed functionality for performing a migration can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for performing data migration in a computer system including at least one host and at least one storage system that stores data written by the host, the at least one storage system providing a plurality of storage volumes to the host to store data written by the host, the plurality of storage volumes including at least one first storage volume and at least one second storage volume, the method comprising acts of:

(A) migrating data from the at least one first storage volume to the at least one second storage volume, the at least one first storage volume being allocated to at least one application program in the computer system to store data;

(B) maintaining the at least one first storage volume available to the at least one application program so that write operations from the at least one application program can be performed to the at least one first storage volume during the act of migrating, wherein the act (A) comprises, at least one point in time during the migration, an act of storing, in a non-volatile storage medium, state information indicating a portion of a data set of the at least one first storage volume successfully copied to the at least one second storage volume at the at least one point in time, and wherein the act (A) comprises acts of reading the data from the at least one first storage volume to the at least one host, and writing the data from the at least one host to the at least one second storage volume; and (C) resuming, after an interruption that results in a loss of at least some state information stored in at least one volatile storage medium in the computer system, the act of migrating without restarting from the beginning of the data set, the act of resuming being performed using the state information stored in the non-volatile storage medium.

2. The method according to claim 1, wherein the act of storing further comprises an act of storing, on at least one of the at least one first storage volume and the at least one second storage volume, a checkpoint that indicates the portion of the data that was successfully copied to the at least one second storage volume.

3. The method according to claim 1, wherein the act of storing further comprises an act of storing, on at least one of the at least one first storage volume and the at least one second storage volume, an indicator that indicates the portion of the data that was successfully copied to the at least one second storage volume.

4. The method according to claim 1, further comprising an act of processing a write operation, the act of processing comprising acts of:
receiving at least one write operation from the at least one application program; and
writing data associated with the at least one write operation to both the at least one first storage volume and the at least one second storage volume.

5. The method according to claim 4, wherein the act of processing a write request further comprises an act of sending an acknowledgement to the at least one application only after data associated with the at least one write operation has been written to both the at least one first storage volume and the at least one second storage volume.

6. The method according to claim 1, wherein the acts of reading data from the at least one first storage volume to the at least one host and writing the data from the at least one host to the at least one second storage volume are performed by a driver in an input/output (I/O) stack of the at least one host.

7. The method according to claim 1, further comprising acts of:
after the act of migrating is complete, intercepting an access request from the at least one application program to the at least one first storage volume; and
redirecting the access request to the at least one second storage volume, so that the access request can be serviced by the at least one second storage volume.

8. The method according to claim 7, wherein the acts of intercepting and redirecting are performed within the at least one host.

9. The method according to claim 8, wherein the at least one host includes an input/output (I/O) stack, and wherein the acts of intercepting and redirecting are performed in the I/O stack.

10. The method according to claim 1, wherein the act of resuming further comprises resuming the act of migrating after the portion of the data identified by the state information as successfully copied.

11. The method of claim 1, wherein the act (A) further comprises (A) migrating data from the at least one first storage volume to the at least one second storage volume under the control of at least one migration layer in the computer system, wherein the at least one migration layer is separate from the at least one application program; and wherein the act of storing the state information further comprises an act of storing, on at least one of the at least one first storage volume and the at least one second storage volume, a checkpoint that indicates the portion of the data that was successfully copied to the at least one second storage volume; and further comprising an act of, in response to a read operation from the at least one application program that reads data from the at least one first storage volume, writing to the at least one second storage volume the data read by the read operation.

12. The method according to claim 11, wherein the act of writing to the at least one second storage volume the data read by the read operation is performed if the data read by the read operation is located before the checkpoint.

13. The method according to claim 11, wherein the at least one migration layer is disposed on the at least one host.

14. The method according to claim 13, wherein the acts of reading data from the at least one first storage volume to the at least one host and writing the data from the at least one host to the at least one second storage volume are performed by a driver in an input/output (I/O) stack of the at least one host.

15. The method according to claim 11, wherein the act of resuming further comprises resuming the act of migrating after the portion of the data identified by the state information as successfully copied.

16. A method for performing data migration in a computer system including at least one host, at least one storage system that stores data written by the host, and at least one controller which is external to the at least one storage system and which is operable to facilitate the data migration, the at least one storage system providing a plurality of storage volumes to the host to store data written by the host, the plurality of storage volumes including at least one first storage volume and at least one second storage volume, the method comprising acts of:

(A) migrating, via the at least one controller which is external to the at least one storage system, a data set from the at least one first storage volume to the at least one second storage volume, the at least one first storage volume being allocated to at least one application program in the computer system to store data wherein the act of migrating starts at a beginning of the data set and progresses to an end of the data set, wherein the act (A) comprises, at least one point in time during the migration, an act of storing, in a non-volatile storage medium, state information indicating a portion of the data set of the at least one first storage volume successfully copied to the at least one second storage volume at the at least one point in time; and (B) resuming, after an interruption that results in a loss of at least some state information stored in at least one volatile storage medium in the computer system, the act of migrating without restarting from the beginning of the data set, the act of resuming being performed using the state information stored in the non-volatile storage medium, wherein the act (A) comprises acts of reading the data from the at least one first storage volume to the at least one host, and writing the data from the at least one host to the at least one second storage volume.

17. The method according to claim 16, further comprising an act of maintaining the at least one first storage volume available to the at least one application program so that write operations from the at least one application program can be performed to the at least one first storage volume during the act of migrating.

18. The method according to claim 16, wherein the interruption results in a loss of volatile state information for the at least one host.

19. The method according to claim 18, wherein the acts of reading data from the at least one first storage volume to the at least one host and writing the data from the at least one host to the at least one second storage volume are performed by a driver in an input/output (I/O) stack of the at least one host.

20. The method according to claim 16, wherein the act of storing further comprises an act of storing, on at least one of the at least one first storage volume and the at least one second storage volume, a checkpoint that indicates the portion of the data that was successfully copied to the at least one second storage volume.

21. The method according to claim 16, wherein the act of storing further comprises an act of storing, on at least one of the at least one first storage volume and the at least one second storage volume, an indicator that indicates the portion of the data that was successfully copied to the at least one second storage volume.

22. The method according to claim 16, further comprising acts of performing a read operation on the at least one first storage volume and performing a write operation on the at least one second storage volume with data read by the act of reading.

23. The method according to claim 16, further comprising an act of processing a write operation, the act of processing comprising acts of:
receiving at least one write operation from the at least one application program; and
writing data associated with the at least one write operation to the at least one first storage volume and the at least one second storage volume.

24. The method according to claim 23, wherein the act of processing a write operation further comprises an act of sending an acknowledgement to the at least one application only after writing data associated with the at least one write operation has been written to both the at least one first storage volume and at least one second storage volume.

25. The method according to claim 16, further comprising acts of:
after the act of migrating is complete, intercepting an access request from the at least one application program to the at least one first storage volume; and
redirecting the access request to the at least one second storage volume, so that the access request can be serviced by the at least one second storage volume.

26. The method according to claim 25, wherein the acts of intercepting and redirecting are performed within the at least one host.

27. The method according to claim 26, wherein the at least one host includes an input/output (I/O) stack, and wherein the acts of intercepting and redirecting are performed in the I/O stack.

28. The method according to claim 16, wherein the act of resuming further comprises resuming the act of migrating after the portion of the data identified by the state information as successfully copied.

29. The method according to claim 16, wherein act (B) includes not re-copying at least some of the data set copied before the interruption.

30. The method according to claim 16, wherein the at least one controller is disposed on the at least one host.

31. The method according to claim 30, wherein the at least one host comprises a server or a client.

32. The method according to claim 16, wherein the at least one controller is disposed in a logical volume manager.

33. The method according to claim 16, wherein the at least one controller is disposed in a file system.

34. A computer-readable medium encoded with instructions for execution on a computer system, the instructions when executed, perform a method comprising acts of:
(A) migrating data from at least one first storage volume to at least one second storage volume, the at least one first storage volume being allocated to at least one application program in the computer system to store data;
(B) maintaining the at least one first storage volume available to the at least one application program so that write operations from the at least one application program can be performed to the at least one first storage volume during the act of migrating,
wherein the act (A) comprises, at least one point in time during the migration, an act of storing, in a non-volatile storage medium, state information indicating a portion of a data set of the at least one first storage volume successfully copied to the at least one second storage volume at the at least one point in time,
wherein the act (A) comprises acts of reading the data from the at least one first storage volume to at least one host, and writing the data from the at least one host to the at least one second storage volume; and
(C) resuming, after an interruption that results in a loss of at least some state information stored in at least one volatile storage medium in the computer system, the act of migrating without restarting from the beginning of the data set, the act of resuming being performed using the state information stored in the non-volatile storage medium.

35. The computer-readable medium according to claim 34, wherein the act of storing further comprises an act of storing, on at least one of the at least one first storage volume and at least one second storage volume, a checkpoint that indicates the portion of the data that was successfully copied to the at least one second storage volume.

36. The computer-readable medium according to claim 34, wherein the act of storing further comprises an act of storing, on at least one of the at least one first storage volume and at least one second storage volume, an indicator that indicates the portion of the data that was successfully copied to the at least one second storage volume.

37. The computer-readable medium according to claim 34, wherein the method further comprises an act of processing a write operation, the act of processing comprising acts of:
receiving at least one write operation from the at least one application program; and
writing data associated with the at least one write operation to both the at least one first storage volume and at least one second storage volume.

38. The computer-readable medium according to claim 37, wherein the act of processing a write operation further comprises an act of sending an acknowledgement to the at least one application only after data associated with the at least one write operation has been written to both the at least one first storage volume and at least one second storage volume.

39. The computer-readable medium according to claim 34, wherein the acts of reading data from the at least one first storage volume and writing the data from the at least one host to the at least one second storage volume are performed by a driver in an I/O stack of the at least one host.

40. The computer-readable medium according to claim 34, wherein the method further comprises acts of:
   after the act of migrating is complete, intercepting an access request from the at least one application program to the at least one first storage volume; and
   redirecting the access request to the at least one second storage volume, so that the access request can be serviced by the at least one second storage volume.

41. The computer-readable medium according to claim 40, wherein the acts of intercepting and redirecting are performed within the at least one host.

42. The computer-readable medium according to claim 41, wherein the at least one host includes an I/O stack, and wherein the acts of intercepting and redirecting are performed in the I/O stack.

43. The computer-readable medium according to claim 34, wherein the act of resuming further comprises resuming the act of migrating after the portion of the data identified by the state information as successfully copied.

44. The computer-readable medium of claim 34, wherein the act (A) further comprises migrating data from the at least one first storage volume to the at least one second storage volume under the control of at least one a migration layer in the computer system, wherein the at least one migration layer is separate from the at least one application program; and
   wherein the act of storing the state information further comprises an act of storing, on at least one of the at least one first storage volume and at least one second storage volume, a checkpoint that indicates the portion of the data that was successfully copied to the at least one second storage volume; and
   wherein the method further comprises an act of, in response to a read operation from the at least one application program that reads data from the at least one first storage volume, writing to the at least one second storage volume the data read by the read operation.

45. The computer-readable medium according to claim 44, wherein the act of writing to the at least one second volume the data read by the read operation is performed if the data read by the read operation is located before the checkpoint.

46. The computer-readable medium according to claim 44, wherein the acts of reading data from the at least one first storage volume and writing the data from the at least one host to the at least one second storage volume are performed by a driver in an I/O stack of the at least one host.

47. The computer-readable medium according to claim 44, wherein the act of resuming further comprises resuming the act of migrating after the portion of the data identified by the state information as successfully copied.

48. A computer-readable medium encoded with instructions for execution on a computer system which includes at least one host, at least one storage system that stores data written by the host, and at least one controller which is external to the at least one storage system, the at least one storage system providing a plurality of storage volumes to the host to store data written by the host, the plurality of storage volumes including at least one first storage volume and at least one second storage volume, the instructions, when executed, causing the at least one controller to perform a method comprising acts of:
   (A) migrating a data set from at least one first storage volume to at least one second storage volume, the at least one first storage volume being allocated to at least one application program in the computer system to store data wherein the act of migrating starts at a beginning of the data set and progresses to an end of the data set,
   wherein the act (A) comprises, at least one point in time during the migration, an act of storing, in a non-volatile storage medium, state information indicating a portion of the data set of the at least one first storage volume successfully copied to the at least one second storage volume at the at least one point in time; and
   (B) resuming, after an interruption that results in a loss of at least some state information stored in at least one volatile storage medium in the computer system, the act of migrating without restarting from the beginning of the data set, the act of resuming being performed using the state information stored in the non-volatile storage medium,
   wherein the act of migrating comprises acts of reading the at least one data set from the at least one first storage volume to at least one host, and writing the data from the at least one host to the at least one second storage volume.

49. The computer-readable medium according to claim 48, wherein the method further comprises an act of maintaining the at least one first storage volume available to the at least one application program so that write operations from the at least one application program can be performed to the at least one first storage volume during the act of migrating.

50. The computer readable medium according to claim 48, wherein the interruption results in a loss of volatile state information for the at least one host.

51. The computer-readable medium according to claim 50, wherein the acts of reading data from the at least one first storage volume to the at least one host and writing the data from the at least one host to the at least one second storage volume are performed by a driver in an I/O stack of the at least one host.

52. The computer-readable medium according to claim 48, wherein the act of storing further comprises an act of storing, on at least one of the at least one first storage volume and the at least one second storage volume, a checkpoint that indicates the portion of the data that was successfully copied to the at least one second storage volume.

53. The computer-readable medium according to claim 48, wherein the act of storing further comprises an act of storing, on at least one of the at least one first storage volume and at least one second storage volume, an indicator that indicates a portion of the data that was successfully copied to the at least one second storage volume.

54. The computer-readable medium according to claim 48, wherein the method further comprises acts of performing a read operation on the at least one first volume and performing a write operation on the at least one second storage volume with data read by the act of reading.

55. The computer-readable medium according to claim 48, wherein the method further comprises an act of processing a write operation, the act of processing comprising acts of:
   receiving at least one write operation from the at least one application program; and
   writing data associated with the at least one write operation to the at least one first storage volume and the at least one second storage volume.

56. The computer-readable medium according to claim 55, wherein the act of processing a write operation further comprises an act of sending an acknowledgement to the at least one application only after data associated with the at least one write operation has been written to both the at least one first storage volume and the at least one second storage volume.

57. The computer-readable medium according to claim 48, wherein the method further comprises acts of:
- after the act of migrating is complete, intercepting an access request from the at least one application program to the at least one first storage volume; and
- redirecting the access request to the at least one second storage volume, so that the access request can be serviced by the at least one second storage volume.

58. The computer-readable medium according to claim 57, wherein the acts of intercepting and redirecting are performed within the at least one host.

59. The computer-readable medium according to claim 58, wherein the at least one host includes an input/output (I/O) stack, and wherein the acts of intercepting and redirecting are performed in the I/O stack.

60. The computer-readable medium according to claim 48, wherein the at least one controller is disposed on the at least one host.

61. The computer-readable medium according to claim 60, wherein the at least one host comprises a server or a client.

62. The computer-readable medium according to claim 48, wherein the at least one controller is disposed in a logical volume manager.

63. The computer-readable medium according to claim 48, wherein the at least one controller is disposed in a file system.

64. A host computer for migrating data in a computer system including the host computer and at least one storage system that stores data written by the host computer, the at least one storage system providing a plurality of storage volumes written by the host computer to store data written by the host computer, the plurality of storage volumes including at least one first storage volume and at least one second storage volume, the host computer comprising:
- a processor to execute at least one application program; and
- a controller adapted to migrate data from the at least one first storage volume to the at least one second storage volume, the at least one storage volume being allocated to at least one application program to store data, the controller being further adapted to maintain the at least one first storage volume available to the at least one application program so that write operations from the at least one application program can be performed to the at least one first storage volume during the act of migrating, wherein the data migrating includes reading the data from the at least one first storage volume to the at least one host, and writing the data from the at least one host to the at least one second storage volume; and
- further comprising means for storing, in a non-volatile storage medium and at least one point in time during the migration, state information indicating a portion of a data set of the at least one first storage volume successfully copied to the at least one second storage volume at the at least one point in time, wherein the controller is further adapted to resume, after an interruption that results in a loss of at least some state information stored in at least one volatile storage medium in the computer system, the act of migrating without restarting from the beginning of the data set, the act of resuming being performed using the state information stored in the non-volatile storage medium.

65. The host computer according to claim 64, further comprising means from reading the data from the at least one first storage volume to the at least one host, and writing the data from the at least one host to the at least one second storage volume.

66. The host computer according to claim 65, wherein the means for reading data from the at least one storage volume includes a driver in an input/output (110) stack of the at least one host.

67. The host computer according to claim 64, wherein the means for storing further comprises means for storing, on the at least one first storage volume and the at least one second storage volume, a checkpoint that indicates the portion of the data that was successfully copied to the at least one second storage volume.

68. The host computer according to claim 64, wherein the means for storing further comprises means for storing, on the at least one first storage volume and the at least one second storage volume, an indicator that indicates the portion of the data that was successfully copied to the at least one second storage volume.

69. The host computer according to claim 64, further comprising means for processing a write operation comprising:
- means for receiving at least one write operation from the at least one application program; and
- means for writing data associated with the at least one write operation to both the at least one first storage volume and the at least one second storage volume.

70. The host computer according to claim 69, wherein the means for processing a write request further comprises means for sending an acknowledgment to the at least one application only after data associated with the at least one write operation has been written to both the at least one first storage volume and the at least one second storage volume.

71. The host computer according to claim 64, further comprising:
- means for intercepting, after migrating the data is complete, an access request from the at least one application program to the at least one first storage volume; and
- means for redirecting the access request to the at least one second storage volume, so that the access request can be serviced by the at least one second storage volume.

72. The host computer according to claim 64, further comprising an input/output (I/O) stack, and wherein the controller is disposed within the I/O stack.

73. The host computer of claim 64, wherein the controller is further adapted to migrate data from the at least one first storage volume to the at least one second storage volume under the control of at least one migration layer in the computer system separate from the at least one application program,
- wherein the means for storing state information further comprises means for storing, on the at least one first storage volume and the at least one second storage volume, a checkpoint that indicates the portion of the data that was successfully copied to the at least one second storage volume; and
- further comprising means, responsive to a read operation from the at least one application program that reads data from the at least one first storage volume, for writing to the at least one second storage volume the data read by the read operation.

74. The host computer according to claim 73, wherein the means for writing to the at least one second storage volume the data read by the read operation if the data read by the read operation is located before the checkpoint.

75. The host computer according to claim 73, further comprising means from reading the data from the at least one first storage volume to the at least one host, and writing the data from the at least one host to the at least one second storage volume.

76. The host computer according to claim 75, wherein the means for reading data from the at least one storage volume includes a driver in an input/output (I/O) stack of the at least one host.

77. A host computer for migrating data in a computer system including the host computer and at least one storage system that stores data written by the host computer, the at least one storage system providing storage volumes to the host computer to store data written by the host computer, the plurality of storage volumes including at least one first storage volume and at least one second storage volume, the host computer comprising:

a processor to execute at least one application program; and
a controller adapted to migrate a data set from at least one first storage volume to at least one second storage volume, the at least one first storage volume being allocated to at least one application program in the computer system to store data, wherein the controller begins migrating data from a beginning of the data set and progresses to an end of the data set; and
a storing layer that stores, in a non-volatile storage medium and at least one point in time during the migration, state information indicating a portion of the date set of the at least one first storage volume successfully copied to the at least one second storage volume at the at least one point in time,
wherein the controller is further adapted to resume, after an interruption that results in a loss of at least some state information stored in at least one volatile storage medium in the host computer, migrating the data set without starting from the beginning of the data set the resuming being performed using the state information stored in the non-volatile storage medium.

78. The host computer according to claim 77, further comprising means for reading the data from the at least one first storage volume to the at least one host, and writing the data from the at least one host to the at least one second storage volume.

79. The host computer according to claim 78, wherein the means for reading data from the at least one storage volume includes a driver in an input/output (I/O) stack of the at least one host.

80. The host computer according to claim 77, wherein the storing layer further comprises means for storing, on the at least one first storage volume and the at least one second storage volume, a checkpoint that indicates the portion of the data that was successfully copied to the at least one second storage volume.

81. The host computer according to claim 80, further comprising means, responsive to a read operation that reads data from the at least one first storage volume, for writing to the at least one second storage volume the data read by the read operation.

82. The host computer according to claim 81, wherein the means for writing to the at least one second storage volume the data read by the read operation if the data read by the read operation is located before the checkpoint.

83. The host computer according to claim 77, wherein the storing layer further comprises means for storing, on the at least one first storage volume and the at least one second storage volume, an indicator that indicates the portion of the data that was successfully copied to the at least one second storage volume.

84. The host computer according to claim 77, further comprising means for processing a write operation comprising:
means for receiving at least one write operation from the at least one application program; and
means for writing data associated with the at least one write operation to both the at least one first storage volume and the at least one second storage volume.

85. The host computer according to claim 84, wherein the means for processing a write request further comprises means for sending an acknowledgment to the at least one application only after data associated with the at least one write operation has been written to both the at least one first storage volume and the at least one second storage volume.

86. The host computer according to claim 77, further comprising:
means for intercepting, after migrating the data is complete, an access request from the at least one application program to the at least one first storage volume; and
means for redirecting the access request to the at least one second storage volume, so that the access request can be serviced by the at least one second storage volume.

87. The host computer according to claim 77, further comprising an input/output (I/O) stack, and wherein the controller is disposed within the 110 stack.

88. The host computer according to claim 77, wherein the at least one host comprises a server or a client.

89. The host computer according to claim 77, wherein the at least one controller is disposed in a logical volume manager.

90. The host computer according to claim 77, wherein the at least one controller is disposed in a file system.

91. The host computer of claim 77, further comprising:
means for receiving at least one write operation from the at least one application program;
means for writing data associated with the at least one write operation to both the at least one first storage volume and the at least one second storage volume; and
means for sending an acknowledgment to the at least one application only after data associated with the at least one write operation has been written to both the at least one first storage volume and the at least one second storage volume.

92. The host computer according to claim 91, further comprising means for reading the data from the at least one first storage volume to the apparatus, and writing the data from the apparatus to the at least one second storage volume.

93. The host computer according to claim 92, further comprising means for storing, in a non-volatile storage medium and at least one point in time during the migration, state information indicating a portion of the at least one first storage volume successfully copied to the at least one second storage volume at the at least one point in time.

94. The host computer according to claim 93, wherein the means for storing further comprises means for storing, on the at least one first storage volume and the at least one second storage volume, a checkpoint that indicates the portion of the data that was successfully copied to the at least one second storage volume.

95. The host computer according to claim 93, wherein the means for storing further comprises means for storing, on the at least one first storage volume and the at least one second storage volume, an indicator that indicates the portion of the data that was successfully copied to the at least one second storage volume.

96. The host computer according to claim 91, further comprising:
means for intercepting, after migrating the data is complete, an access request from the at least one application program to the at least one first storage volume; and means for redirecting the access request to the at least one second storage volume, so that the access request can be serviced by the at least one second storage volume.

97. The host computer according to claim 91, further comprising a logical volume manager.

98. The host computer according to claim 91, further comprising a file system.

* * * * *